United States Patent [15] 3,690,491
Butler, Jr. [45] Sept. 12, 1972

[54] REEL TRAILER
[72] Inventor: Cornelius Butler, Jr., Rt. 8 Box 647, Greensboro, N.C. 27406
[22] Filed: Dec. 7, 1970
[21] Appl. No.: 95,769

[52] U.S. Cl....................................214/506, 214/390
[51] Int. Cl. ..................................................B60p 1/28
[58] Field of Search.214/505, 506, 384, 390, DIG. 1, 214/DIG. 3, DIG. 4

[56] References Cited

UNITED STATES PATENTS 1,678,395  7/1928  Kellems..................214/DIG. 4
1,587,842  6/1926  Knox......................214/DIG. 1
1,231,040  6/1917  Marshall................214/DIG. 4
2,628,733  2/1953  Hale..........................214/506

Primary Examiner—Albert J. Makay
Attorney—David Rabin

[57] ABSTRACT

A cable reel trailer including a wheeled, Y-shaped main frame is pivotably attached to a tongue having a coupling for attachment to a towing vehicle. Reel supporting and lifting surfaces, secured to uprights mounted upon the main frame, transfer the reel between the trailer and the ground upon pivotable displacement of the tongue relative to the main frame due to movement of the towing vehicle and tongue relative to the main frame support wheels.

10 Claims, 11 Drawing Figures

INVENTOR
CORNELIUS BUTLER, JR.

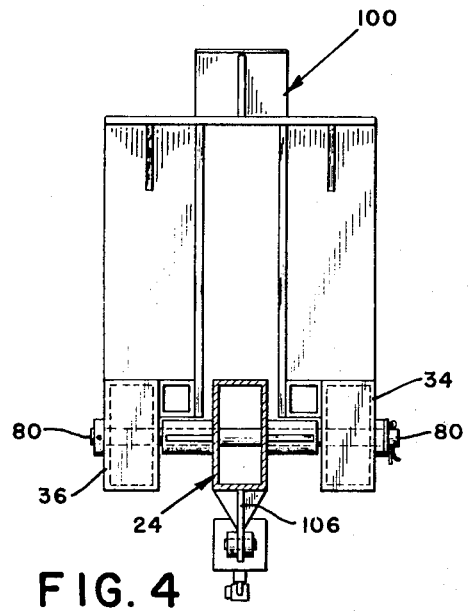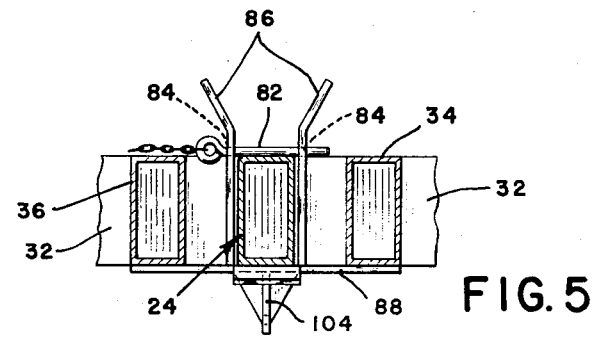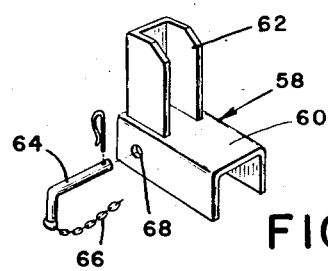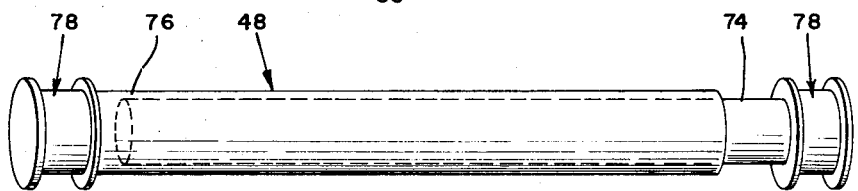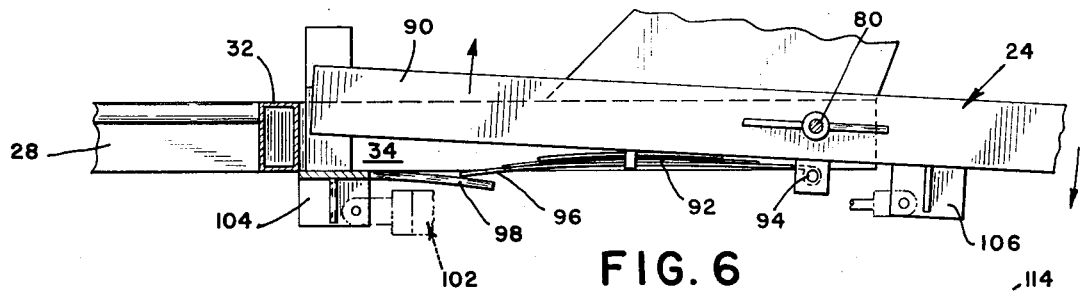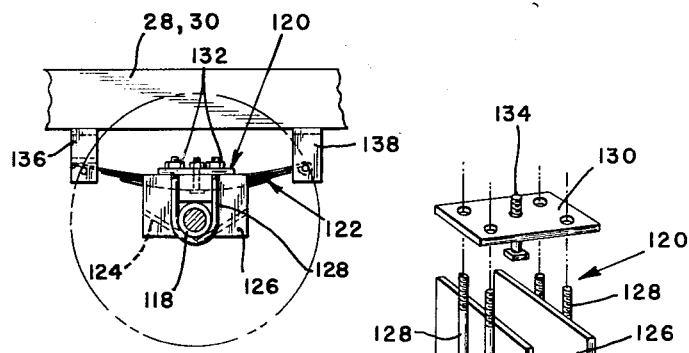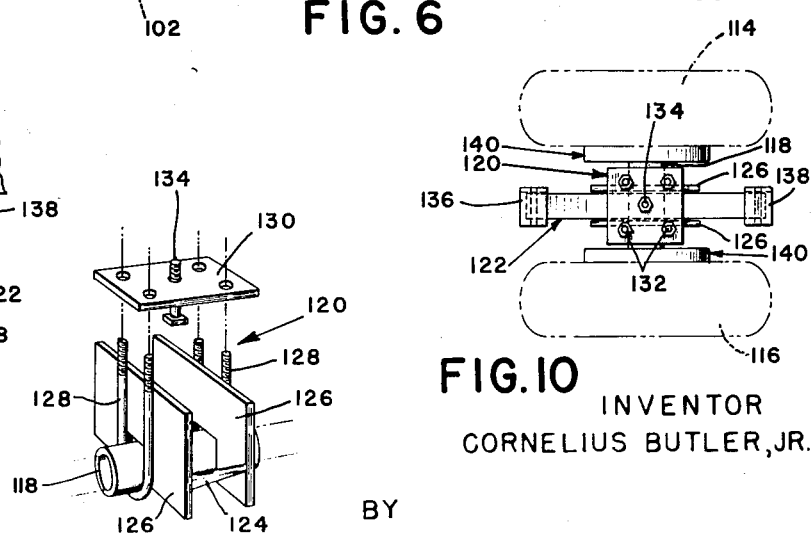

REEL TRAILER

BRIEF SUMMARY AND OBJECTS OF THE INVENTION

This invention relates generally to trailers and more particularly to an improved reel trailer for handling and conveying heavy reel units such as wire rope, power transmission lines, telephone cables, etc.

Briefly, the present invention comprises a wheeled, open frame carrier for transferring large reels to and from ground support and for transporting the reels to desired locations. The carrier main frame is pivotably secured to a tongue member and has spaced, parallel supports mounted thereon which are adapted to tilt or pivot about the axis of the trailer support wheels to lift or lower a reel. The reel supports are tilted upon displacement of the tongue and main frame relative to each other, the tilting being affected by movement of the towing vehicle relative to the trailer support wheels which are selectively locked through a braking system controlled from the towing vehicle. This permits heavy reels of various diameters to be quickly loaded and unloaded.

One of the primary objects of the invention is the provision of a reel trailer for readily loading and unloading reels without the use of auxiliary jacks or other hoisting mechanisms.

Another object of the invention is the provision of a simple, effective and convenient means for transferring reels between ground support and trailer mounted positions.

Still another object of the invention is the provision of a rugged, durable reel trailer including discrete laterally spaced wheel suspension systems.

Other objects and advantages of the invention will become apparent during the course of the following detailed description.

BRIEF DESCRIPTION OF THE FIGURES

FIG. 4 is an enlarged view taken along line 4—4 of FIG. 1 illustrating the assembly for pivotably interconnecting the carrier main frame and the tongue;

FIG. 5 is an enlarged cross-sectional view taken along line 5—5 of FIG. 1 illustrating the locking assembly for retaining the main frame and the tongue in an aligned condition;

FIG. 6 is an enlarged view taken along line 6—6 of FIG. 1;

FIG. 7 is a perspective view of a locking member slidably positioned upon the track portion of the reel supporting uprights for locking the reel thereto;

FIG. 8 is a perspective view of a reel supporting axle shaft for engaging the track portions of the carrier uprights;

FIG. 9 is an exploded, perspective view of stabilizing means for securing a wheel axle to the main frame;

FIG. 10 is a fragmentary side view of the carrier illustrating the manner of securing a wheel assembly to the main frame; and FIG. 11 is a top plan view of the axle stabilizing means and the spring means for attaching a wheel unit to the main frame, the wheels being shown in broken outline.

DETAILED DESCRIPTION OF THE INVENTION

Figure 3:
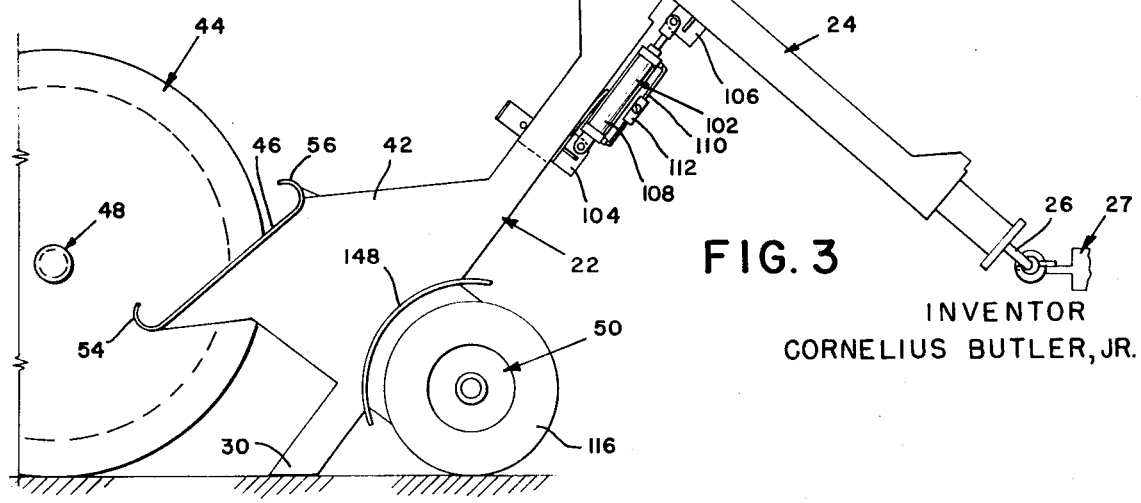
FIG. 3 is a side elevational view of the carrier with the carrier main frame tilted to a ground engaging position for loading or unloading a reel.

Referring to the drawing, the reel trailer 20 preferably comprises a generally Y-shaped main frame 22 and a tongue 24 having a member 26 for releasably coupling the trailer to a tractor unit or other motor vehicle, a portion 27 of which has been shown in FIG. 3, for travel to desired locations and positionable for reel pickup or reel deposit to a ground support.

The main frame 22 includes parallel, longitudinally extending frame members 28 and 30 interconnected by a transverse member 32 at the forward end portions of members 28, 30. The frame members are spaced laterally sufficiently to receive a reel therebetween.

Extending forwardly of and positioned intermediate the ends of transverse member 32 are a pair of spaced, parallel support members 34 and 36 for receiving an end portion of the tongue 24 therebetween. Forwardly converging frame members 38 and 40 interconnect the end portions of the transverse bar 32 to the parallel support members 34, 36. The various members of the main frame 22 and tongue 24 preferably are formed of rectangular, tubular construction.

A longitudinally extending upright plate 42 is secured to the upper portion of each of the frame members 28 and 30 for supporting a reel 44 thereon. Carried by the uppermost edge of each upright 42 is a rail 46 defining a trackway for the reel axle shaft 48. The rails 46 are inclined relative to the frame members 28, 30, as shown by the drawing, with the lower ends being located forwardly of the axis of the wheel units 50 and 52 to guard against undesirable forces transmitted to the coupling 26 and the hitch of a towing vehicle due to the weight of the reel. Further, it is desirable to carry the reel forwardly of the wheel axis to prevent the trailer from tipping rearwardly when paying out cable or wire from the reel 44. The ends of rails 46 are provided with opposed hook portions 54 and 56 which serve as stop members for the reel shaft 48. Once the reel 44 and shaft 48 have bee mounted upon the inclined rails in abutting relation with the hook portions 56, lock assemblies 58 are mounted upon the rails 46 and secured to the uprights 42.

Figure 1:
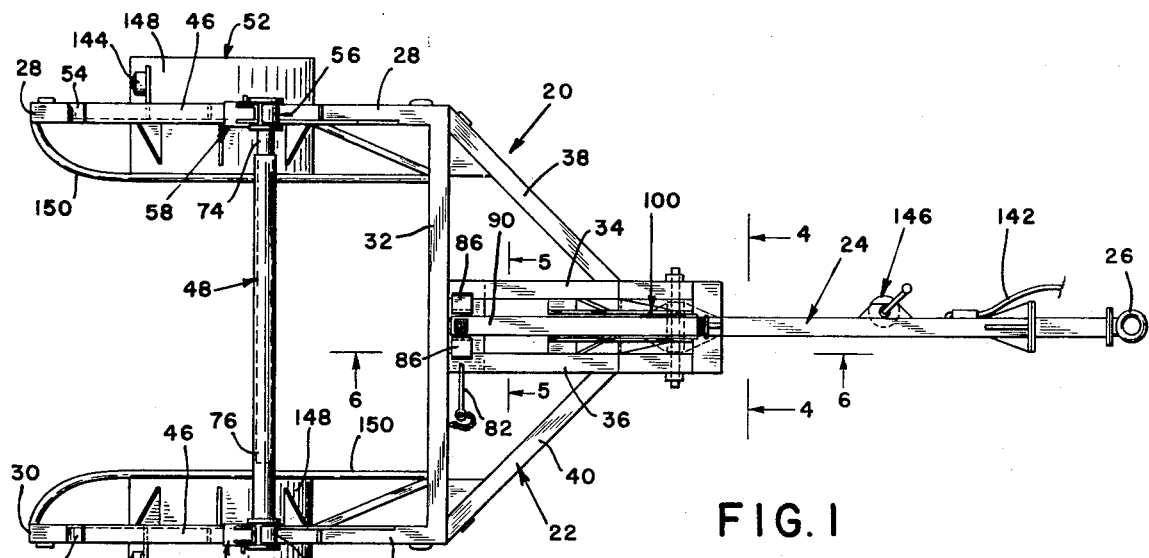
FIG. 1 is a top plan view of the reel carrier of the present invention.
Figure 2:
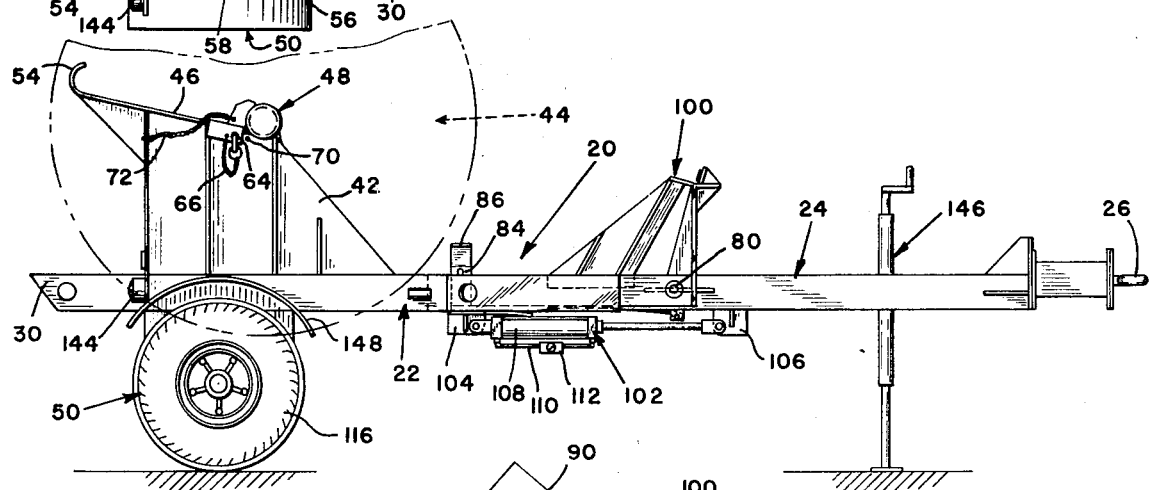
FIG. 2 is a side elevational view of the carrier of FIG. 1, the broken lines indicating a reel supported thereon.

The lock assemblies 58, FIG. 7, include a first, inverted channel section 60, adapted to be slidably positioned upon a rail 46, and a channel section 62 secured to the section 60 at one end. The section 62 may be angularly disposed with respect to section 60 for engaging the reel shaft 48, as shown by FIG. 2. An L-shaped locking pin 64, attached to the section 60 by a flexible member 66, is adapted to be inserted through aligned openings 68 in the section 60 and through a selected one of a plurality of openings 70 in the upright 42. The hook portions 56 and the lock assemblies 58 cooperate to lock the reel shaft 48 to the uprights 42. Lock assemblies 58 may be attached to the uprights by flexible members 72.

Preferably, the reel 44 has an opening extending axially therethrough for receiving the shaft 48. However, the reel may be provided with axial hub portions secured thereto. Shaft 48 consists of telescoping sections 74 and 76 having flanged portions 78 at the outer ends to prevent axial displacement of the shaft during rolling contact with rails 46.

The forwardly extending parallel support members 34 and 36 of the main frame are pivotably connected to the tongue 24 through a pin 80 which permits the main frame to tilt rearwardly and facilitate loading or unloading of the reel upon the rails 46 of the uprights 42. To prevent inadvertent tilting of the main frame rearwardly about the axis of the wheel units 50 and 52 when the tongue is secured to a vehicle by coupling 26, a locking pin 82 is releasably positioned within aligned apertures 84 in angle plates 86. The angle plates 86 are mounted in spaced relation upon a plate 88 secured beneath members 34 and 36. Therefore, as shown by FIG. 5, the end portion 90 of tongue 24 is confined between the plate 88, members 34, 36 and the pin 82.

In order to facilitate initial pivotable displacement of the tongue and main frame relative to each other, a leaf spring assembly 92 has one attached to the tongue as at 94 while the other end 96 extends freely for engaging a plate 98. With the tongue and main frame retained in fixed relation by pin 82, the spring assembly 92 is compressed, as shown by FIG. 2. However, upon removal of the pin 82, the spring end portion 96 acts upon plate 98 to initiate displacement of tongue end 90 upwardly about pivot pin 80 as illustrated by FIG. 6.

A stop unit 100 is attached to the forwardly extending ends of member 34, 36 for limiting pivotable displacement of the main frame and tongue relative to each other, as shown by FIG. 3.

The rate of descent of the main frame and the tongue end portion 90 from the FIG. 3 position to the FIG. 2 position is controlled by a fluid cylinder assembly 102 which has one end attached to a mounting bracket 104 fastened to the main frame 22 while the other end is attached to bracket 106 mounted upon tongue 24. The fluid travels from one end of the cylinder 108 to the other through fluid line 110 and a flow control valve 112. Valve 112 may be adjusted to regulate fluid flow therethrough.

Referring to FIGS. 9-11, each wheel unit 50 and 52 comprises dual wheels 114, 116 mounted upon the relatively short axle member 118 located at each side of the trailer 20. The dual wheel units are mounted upon the main frame by a stabilizing assembly 120 and spring unit 122. Each stabilizing assembly 120 includes a generally V-shaped plate 124 having vertically disposed plates 126 secured thereto in spaced, parallel relation. Plates 126 are provided with slots for receiving an axle 118 therethrough and above V-shaped plate 124, as shown by FIG. 9. U-bolts 128, located outwardly of plates 126, extend around axle 118 and have the ends project through a horizontal plate 130 resting upon the plates 126. Fasteners 132 maintain the axle 118 and plates 124, 126, 130 in assembled relation. Each leaf spring unit 122 is positioned between parallel plates 126 and below horizontal plate 130 of an axle stabilizer assembly 120 and is secured thereto by a bolt 134 which passes through plate 130 and the spring unit 122. The ends of each spring unit are secured to the main frame 22 by brackets 136, 138, one pair of brackets being mounted upon each of the longitudinally extending frame members 28 and 30.

The trailer 20 is provided with a conventional braking system which is adapted to be controlled from a towing vehicle. Preferably the system includes electrically operated brake units 140 for the wheel units which are actuated through an electrical cable 142 adapted to be coupled to a towing vehicle by a conventional electrical connector, not shown. The cable 142 may extend rearwardly through the tubular members forming the tongue and main frame to the electric brakes and the trailer lights 144.

A jack arrangement 146 supports the tongue 24 and main frame 22 in a generally horizontally disposed position when the trailer is not connected to a towing vehicle. The trailer also may be equipped with fenders 148 and guard members 150 positioned inwardly of the longitudinally extending main frame members 28 and 30.

In the operation of the reel trailer, a reel 44 may be lifted from the ground or a supporting surface by removing the locking pin 82 permitting the tongue end 90 to pivot to the position of FIG. 6. The trailer brake system then is actuated from the towing vehicle to lock the wheel units 50 and 52. Rearward movement of the towing vehicle relative to the fixed wheel units of the trailer 20 displaces the main frame and the tongue to the position of FIG. 3 wherein the angled end portions of main frame members 28 and 30 engage the ground. In this position, the uprights 42 are tilted rearwardly such that shaft 48, which has been inserted through reel 44, can engage rails 46 as the reel is rolled forwardly between the spaced uprights. The lock assemblies 58 must be removed from the rails 46 before lifting of the reel 44. With the trailer wheels still locked, the towing vehicle moves forward displacing the main frame 22 and the tongue 24 to the FIG. 2 position whereby lock pin 82 may be properly positioned. During forward tilting of the main frame 22, the hooks 54 prevent disengagement of the shaft 48 from the rails 46. The lock assemblies are repositioned upon the rails 46 and secured to the uprights 42 after the reel shaft has rolled forward into engagement with the hooks 56. After the reel has been secured to the uprights 42, the trailer brakes are released and the trailer towed to a selected destination.

The reel 44 may be unloaded from the trailer in a similar manner.

I claim:

1. A carrier adapted to be coupled to a towing vehicle for transporting reels and the like and adapted for effecting reel transfer from a support surface onto the carrier and from the carrier to a support surface comprising, a main support frame, a tongue pivotally connected to and extending forwardly of said main frame to normally lie in a substantially horizontal plane for connection to a towing vehicle, wheel assembly means including axle means secured to said main frame, a pair of laterally spaced uprights secured to said main frame for supporting the axle shaft of a cable reel thereon, releasable locking means normally retaining said main support frame and said tongue in a generally horizontal plane, and resilient means on said carrier for initially urging pivotable displacement of said main support frame and said tongue relative to each other in response to release of said locking means to initiate tilting of said main frame and said uprights rearwardly about said wheel assembly means.

2. A carrier for transporting reels as recited in claim 1, each of said pair of uprights having a trackway extending longitudinally of said carrier and engageable by the reel shaft for rolling displacement therealong, said trackways having stop means at the forward and rearward ends thereof, said stop means at the forward ends of said trackways being positioned forwardly of the axle means of said wheel assembly means.

3. A carrier for transporting reels as defined in claim 1, said wheel assembly means including a pair of spaced wheel units, one unit being positioned beneath each of said pair of uprights, and stabilizing means for resiliently securing said units to said main frame.

4. A carrier for transporting reels as defined in claim 1, and further including means connected to said main support frame and said tongue for controlling the rate of pivotable displacement of said main support frame relative to said tongue when a reel has been positioned upon said uprights.

5. A carrier for transporting reels and the like and adapted for effecting reel transfer from a support surface onto the carrier and from the carrier to a support surface comprising a main support frame, a tongue extending forwardly of said main frame to normally lie in a substantially plane for connection to a towing vehicle, wheel assembly means secured to said main frame, a pair of laterally spaced uprights secured to said main frame for supporting the axle shaft of a cable reel thereon, and means for facilitating pivotable displacement of said main frame about said wheel assembly means to effect reel transfer between a support surface and said pair of uprights, said means for facilitating pivotable displacement of said main frame about said reel assembly means including means pivotably connecting said main frame and said tongue and a braking system, adapted to be actuated from a towing vehicle for controlling the rotation of said wheel assembly means, said pivotable connecting means and said braking system cooperating to tilt said main frame and said uprights rearwardly about said wheel assembly means upon rearward displacement of said tongue by a towing vehicle.

6. A carrier for transporting reels as defined in claim 5, and further including locking means for normally retaining said main frame and said tongue longitudinally aligned, and means for urging displacement of said tongue relative to said main frame upon release of said locking means.

7. A carrier for transporting reels as defined in claim 6, said means for urging displacement of said tongue relative to said main frame including a spring.

8. A carrier for transporting reels as defined in claim 6, and further including means for controlling the rate of pivotable displacement of said main frame relative to said tongue.

9. A carrier for transporting reels as defined in claim 2, and further including releasable lock means cooperating with said forward stop means for securing a reel to said uprights.

10. A carrier for transporting reels as recited in claim 1, said main frame extending rearwardly of said support surface to limit pivotable displacement of said main frame about the axis of said wheel assembly means.

* * * * *